United States Patent
Allen

(10) Patent No.: US 8,150,838 B2
(45) Date of Patent: Apr. 3, 2012

(54) METHOD AND SYSTEM FOR A METADATA DRIVEN QUERY

(75) Inventor: Corville O. Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 12/060,136

(22) Filed: Mar. 31, 2008

(65) Prior Publication Data

US 2009/0248634 A1    Oct. 1, 2009

(51) Int. Cl.
*G06F 17/30* (2006.01)
*G06F 7/00* (2006.01)

(52) U.S. Cl. .................. 707/720; 707/728; 707/731

(58) Field of Classification Search .......... 707/720
See application file for complete search history.

(56) References Cited

U.S. PATENT DOCUMENTS

| | | | |
|---|---|---|---|
| 6,609,123 B1 | 8/2003 | Cazemier et al. ............. 707/4 |
| 6,950,815 B2 * | 9/2005 | Tijare et al. .................. 1/1 |
| 7,181,444 B2 * | 2/2007 | Porter et al. .................. 1/1 |
| 2003/0177481 A1 | 9/2003 | Amaru et al. ............. 717/148 |
| 2004/0128276 A1 * | 7/2004 | Scanlon et al. .............. 707/1 |
| 2004/0174397 A1 | 9/2004 | Cereghini et al. ........... 345/855 |
| 2005/0010565 A1 * | 1/2005 | Cushing et al. ............. 707/3 |
| 2006/0004738 A1 * | 1/2006 | Blackwell et al. ........... 707/4 |
| 2006/0020397 A1 * | 1/2006 | Kermani ..................... 702/20 |
| 2006/0200438 A1 * | 9/2006 | Schloming ................... 707/1 |
| 2006/0248080 A1 * | 11/2006 | Gray ........................... 707/7 |
| 2007/0192300 A1 * | 8/2007 | Reuther et al. .............. 707/3 |
| 2008/0077588 A1 * | 3/2008 | Zhang et al. ................ 707/6 |
| 2008/0155147 A1 * | 6/2008 | Howard ....................... 710/105 |
| 2009/0089044 A1 * | 4/2009 | Cooper et al. ............... 704/9 |

\* cited by examiner

*Primary Examiner* — Don Wong
*Assistant Examiner* — Binh V Ho
(74) *Attorney, Agent, or Firm* — Samuel K. Simpson; Patent Ingenuity, P.C.

(57) ABSTRACT

A computer program is provided. The computer program product includes a computer useable medium having a computer readable program. The computer readable program when executed on a computer causes the computer to receive a query. Further, the computer readable program when executed on a computer causes the computer to generate a common metadata based query object that includes metadata for the query and data associated with the query. In addition, the computer readable program when executed on a computer causes the computer to extract the metadata from the common metadata based query object. Finally, the computer readable program when executed open a computer causes the computer to generate an application specific query based on the metadata and an application to which the query is intended.

14 Claims, 7 Drawing Sheets

106

Customer
    queryInfo="CLAUSE"
    queryPart="Where"
    queryRole="target"
    Name=
        queryInfo=
        queryRole="result"
    Age=
        queryInfo=
    ID=15
        queryInfo=IN
    Status
        queryInfo=

Customer_Collection
    queryPart="Where"
    queryRole="Target"

Customer
        queryInfo="CLAUSE"
        queryPart="Where"
        Name=
            queryInfo=
            queryRole="result"
        Age=
        queryInfo="GreaterThan"
        ID=
            queryInfo=
        Status=Gold
            queryInfo=IN Customer
        queryInfo="CLAUSE"
        queryPart="And"
        Name=
            queryInfo=
            queryRole="result"
        Age=
        queryInfo="GreaterThan"
        ID=
            queryInfo=
        Status=Silver
            queryInfo=IN

*Figure 4*

METHOD AND SYSTEM FOR A METADATA DRIVEN QUERY

BACKGROUND

1. Field

This disclosure generally relates to software. More particularly, the disclosure relates to queries.

2. General Background

A query based system is typically utilized in an Enterprise Information System ("EIS") or a relational database to retrieve of specific information. Query based systems are generally very different depending on the EIS. For example, the features, the query interface, and/or or query language may be different.

While a relational database utilizes Structured Query Language ("SQL") to query the tables in the database for information, an EIS may use a similar query system, but with different keywords. The EIS may even utilize an English centric query system. Enterprise adapters utilize the application specific application programming interfaces ("APIs") or mechanisms to perform queries within the EIS.

As the query based systems vary for different EISs, enterprise adapters or systems that access the EISs may have to deal with different structured or unstructured queries prior to transforming these queries into the enterprise specific query system. These enterprise adapters or systems that access the EISs have to parse multiple and different query languages, and perform a translation into an enterprise specific query request. The need for knowledge of multiple query languages and their structure can be overwhelming and difficult to perform, which generally results in multiple systems and different data formats per query language.

SUMMARY

In one aspect of the disclosure, a computer program product is provided. The computer program product includes a computer useable medium having a computer readable program. The computer readable program when executed on a computer causes the computer to receive a query. Further, the computer readable program when executed on a computer causes the computer to generate a common metadata based query object that includes metadata for the query and data associated with the query. In addition, the computer readable program when executed on a computer causes the computer to extract the metadata from the common metadata based query object. Finally, the computer readable program when executed on a computer causes the computer to generate an application specific query based on the metadata and an application to which the query is intended.

In another aspect of the disclosure, a process is provided. The process receives a query. Further, the process generates a common metadata based query object that includes metadata for the query and data associated with the query. In addition, the process extracts the metadata from the common metadata based query object. Finally, the process generates an application specific query based on the metadata and an application to which the query is intended.

In yet another aspect of the disclosure, a system is provided. The system includes a query-to-data format converter that receives a query and generates a common metadata based query object that includes metadata for the query and data associated with the query. Further, the system includes a query executor that extracts the metadata from the common metadata based query object and generates an application specific query based on the metadata and an application to which the query is intended.

DRAWINGS

The above-mentioned features of the present disclosure will become more apparent with reference to the following description taken in conjunction with the accompanying drawings wherein like reference numerals denote like elements and in which:

FIG. 3 illustrates an example of the query object that is generated from a query.

FIG. 4 illustrates a customer query data object represented by a wrapper that contains multiple customers.

DETAILED DESCRIPTION

A method and system provide a metadata driven query. In one embodiment, a metadata driven query interface is provided to alleviate the need for different query data formats for each EIS. As a result, general query conversion may be utilized for an existing data format to an enterprise specific query request.

Figure 1:
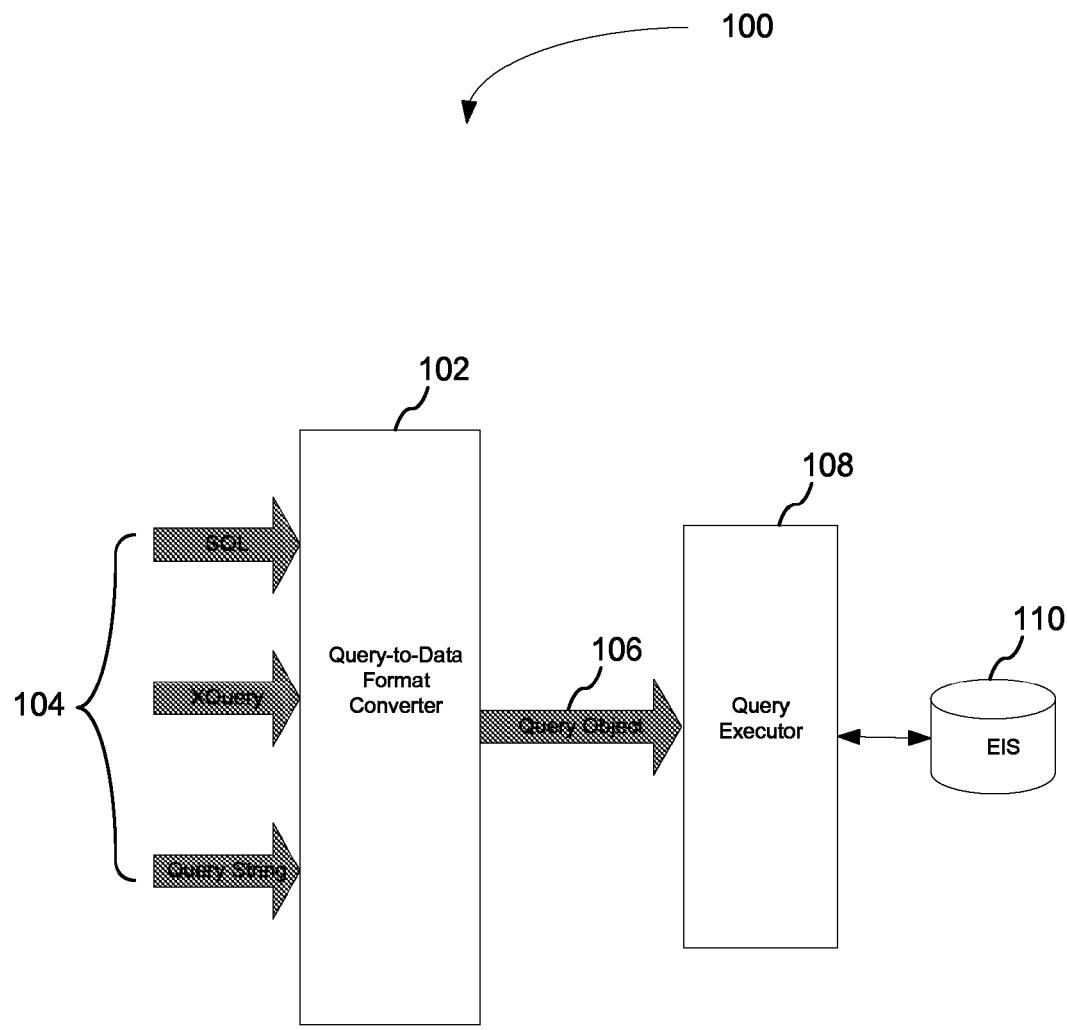
FIG. 1 illustrates a metadata driven query system.

FIG. 1 illustrates a metadata driven query system 100. The metadata driven query system 100 includes a query-to-data format converter 102, a query executor 108, and an EIS 110. The query-to-data format converter 102 may receive different queries 104 and transform those different queries 104 to a common metadata based query object 106. Further, in one embodiment, the query executor 108 is enterprise application specific. The query executor 108 then utilizes the metadata and the data in the common metadata based query object 106 to execute a query request in the EIS 110.

The incoming query 104 could be SQL, XML Query Language ("XQuery"), Query String, or any number of forms of various queries. Further, the query object 106, which is the output of the query-to-data format converter, includes the data and the query embedded as metadata in the common metadata based query object 106. In alternative embodiment, the data and the query may be provided as metadata that goes along with the common metadata based query object 106. The query executor 108 reads the values from the query object 106 and/or additional metadata, depending on whether the metadata is provided along with the query object 106 or embedded as a value in the common metadata based query object 106 itself, and constructs query execution artifacts needed to make a call on the underlying EIS 110.

One form of the data and the metadata can be XML with annotations denoting the query keywords and actions. Another form of the data and metadata can be an object with embedded metadata at each property level within the object.

In one embodiment, rules are specified and followed for keywords and action identifiers based on what they represent and how many exist in the incoming common metadata based query object 106. For example, when the keyword IN is specified on a property, it is treated as an equality for that query search. If more than one keyword is specified for the same property type, those keywords are treated as a list of values.

Figure 2:
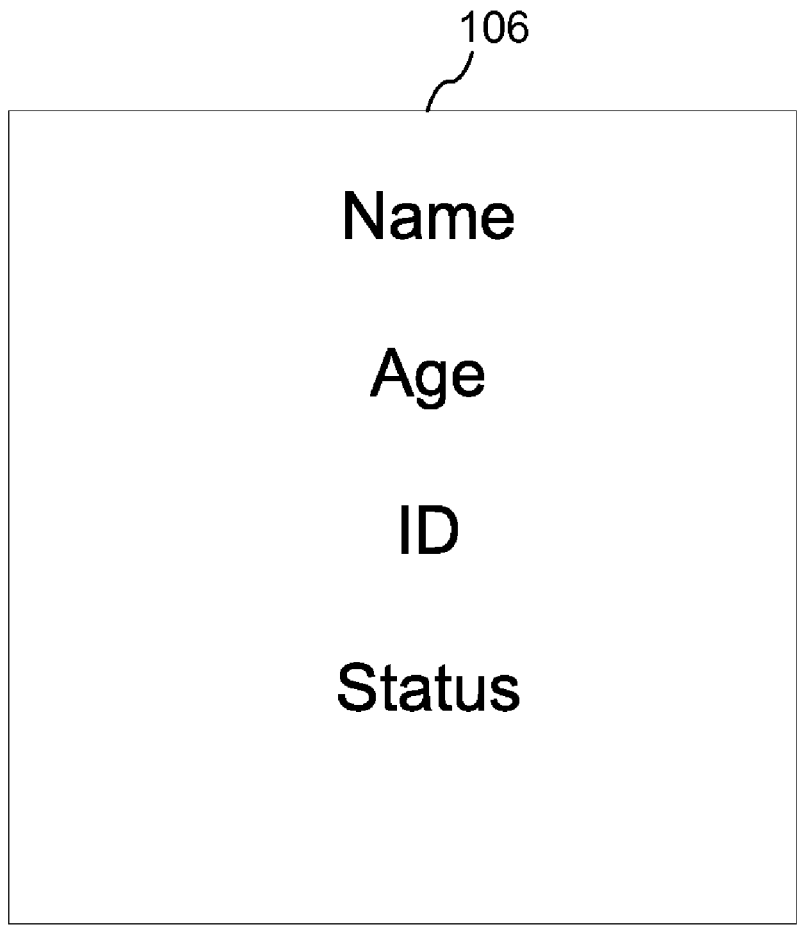
FIG. 2 illustrates an example of a data definition for the query object.

FIG. 2 illustrates an example of a data definition for the common metadata based query object 106. The data definition includes the metadata utilized to represent the query in the query object 106. The data definition may include fields such as Name, Age, Identifier ("ID"), and Status. An example of code for the data definition is provided below:

```
<complexType name = "Customer">
   <annotation>
      <query Info> </queryInfo>
      <queryPart> </queryPart>
      <queryTarget> </queryTarget>
   </annotation>
<element>name</element>
   <annotation>
      <queryInfo> </queryInfo>
      <queryRole> </queryRole>
   </annotation>
<element>Age</element>
   <annotation>
      <queryInfo> </queryInfo>
      <queryRole> </queryRole>
   </annotation>
<element>ID</element>
   <annotation>
      <queryInfo> <queryInfo>
      <queryRole> </queryRole>
   <annotation>
<element>Status</element>
   <annotation>
      <queryInfo> <queryInfo>
      <queryRole> </queryRole>
   <annotation>
<complexType>
```

FIG. 3 illustrates an example of the common metadata based query object 106 that is generated from a query 104. An example of a query 104 may be an SQL query as follows: Select Name from CUSTOMER Where ID=15. This query 104 is converted by the query-to-data format converter 102 into a common metadata based query object 106, which is a customer query data object with query metadata.

As can be seen from the example of the customer query data object above, the customer is the data of interest. Further, the customer query data object includes the values needed for the 'Where' clause. The query is interested in the object with an ID value equaling 15. Accordingly, rules are provided to govern the query Info metadata. When IN is specified and only one exists, it is treated as an equal. If no query target is specified, then the incoming query data object will be treated as the query target.

The EIS specific query request may map a query such as this to a function call. The EIS equivalent of customer and the ID are specified. Further, and indication is provided that the request is a search. The query executor 108 extracts this information from the customer query data object and performs the request.

FIG. 4 illustrates a customer query data object represented by a wrapper that contains multiple customers. An example of a more complex query may be the following SQL query: SELECT name from CUSTOMER where status IN ('Gold', 'Silver') and AGE >25. In this example, the query object 106 is dynamically created to return a plurality of customer objects if one does not exist. In other words, a wrapper object, which wraps multiple instances or a collection of instances of the data object, is outputted.

The query-to-data format converter 102 may dynamically create one of these wrapper objects utilizing namespace and schema definitions to create an on the fly definition with the correct multiplicity to represent the data set for the query. Similarly, on the fly dynamic wrapper objects can be created for two or more data objects to represent a query. An example is a query 104 that includes a customer and an address.

The query-to-data format converter 102 performs the following tasks to create or enter the query metadata into this common metadata based query object 106. If the query object 106 already exists as a collection, the query-to-data format converter 102 would just provide the query metadata values as shown in FIG. 4. Otherwise, the query-to-data format converter 102 would dynamically create a common metadata based query object 106 as shown in FIG. 4 and enter the values.

Building the query object involves a series of tasks. The query 104 is parsed to determine the querying target component or object. The query 104 is also parsed to determine the return types that are necessary for the target component. The type of query 104 is also discerned from the query 104. The values required to specify a condition are mapped to the condition types and their values. These values are then matched up and entered into their respective types and values in the query data object.

Figure 5:
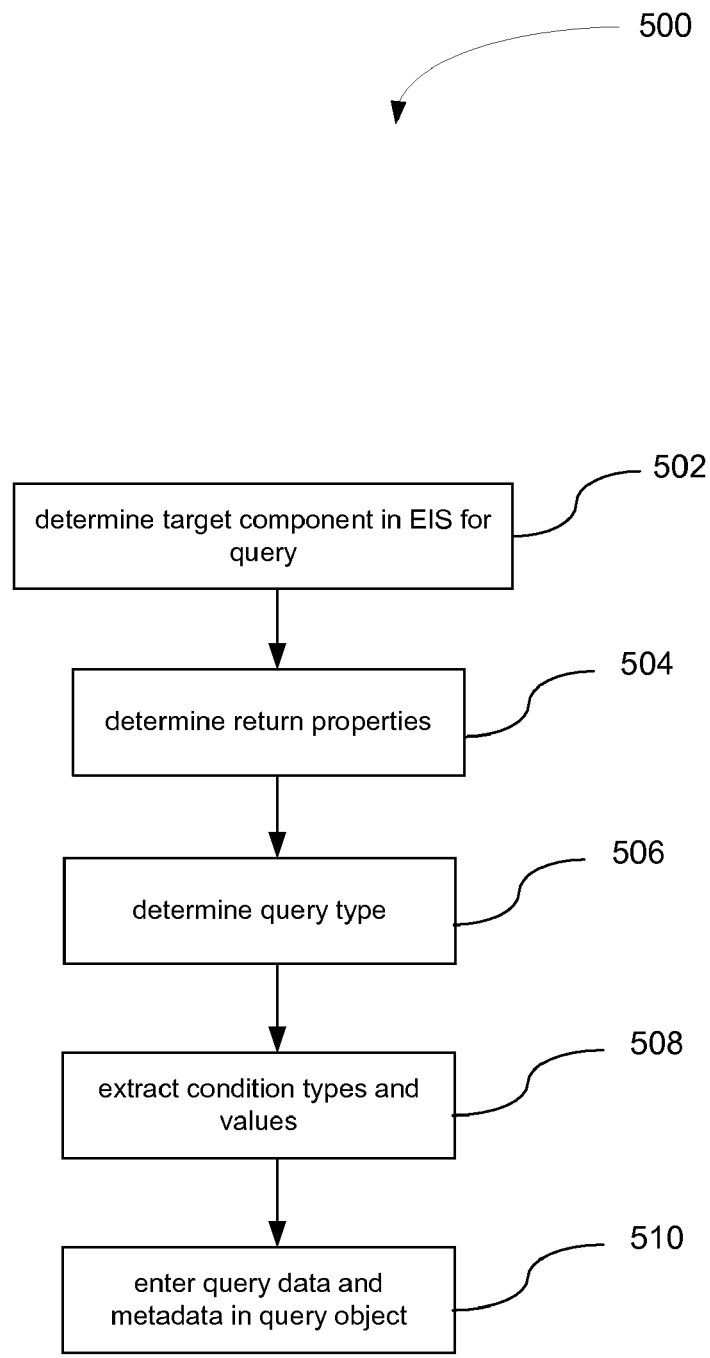
FIG. 5 illustrates a process that may be utilized to parse the query to obtain relevant information needed to form the query object.

FIG. 5 illustrates a process 500 that may be utilized to parse the query 104 to obtain relevant information needed to form the common metadata based query object 106. At a process block 502, the process 500 determines a target for the query 104. For example, the query executor 108 determines the target component in the EIS 110 for which to make the function call. Further, at a process block 504, the process 500 determines return properties. In other words, the expected return values are specified. In addition, at a process block 506, the process 500 determines the query type so that the query type can be mapped to an EIS specific functionality equivalent. At a process block 508, the process 500 also extracts condition types and values so that the data sets utilized to make the query in the EIS 110 may be constructed. Finally, at a process block 510, the process 500 enters the query data and metadata in the common metadata based query object 106. Accordingly, the data parsed from the process 500 may be prepared in the EIS specific context, and request may then be provided. The results would be entered into the return target component, and sent back to the client which made the request.

Figure 6:
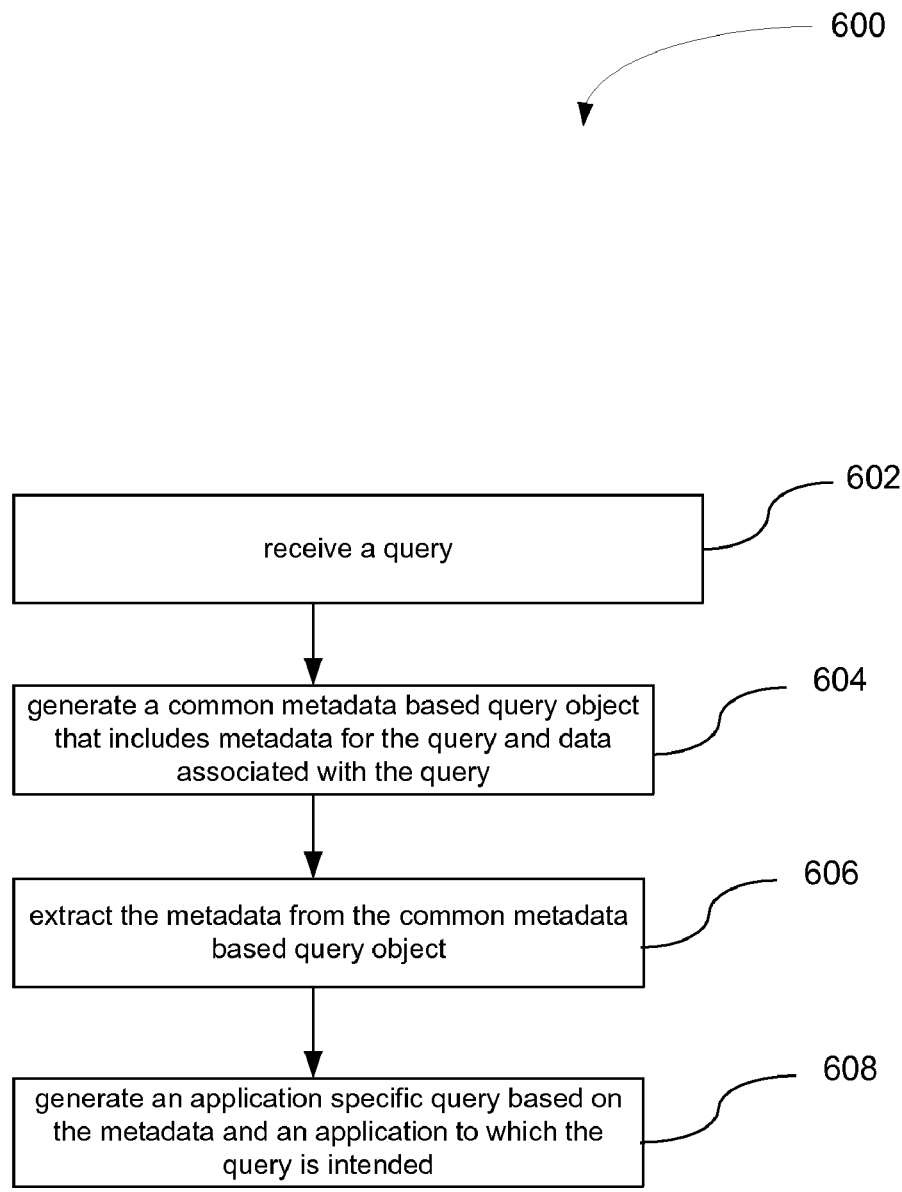
FIG. 6 illustrates a process that may be utilized to generate a metadata driven query.

FIG. 6 illustrates a process 600 that may be utilized to generate a metadata driven query. At a process block 602, the process 600 receives a query. Further, at a process block 604, the process 600 generates a common metadata based query object that includes metadata for the query and data associated with the query. In addition, at a process block 606, the process 600 extracts the metadata from the common metadata based query object 106. Finally, at a process block 608, the process 600 generates an application specific query based on the metadata and an application to which the query is intended.

Figure 7:
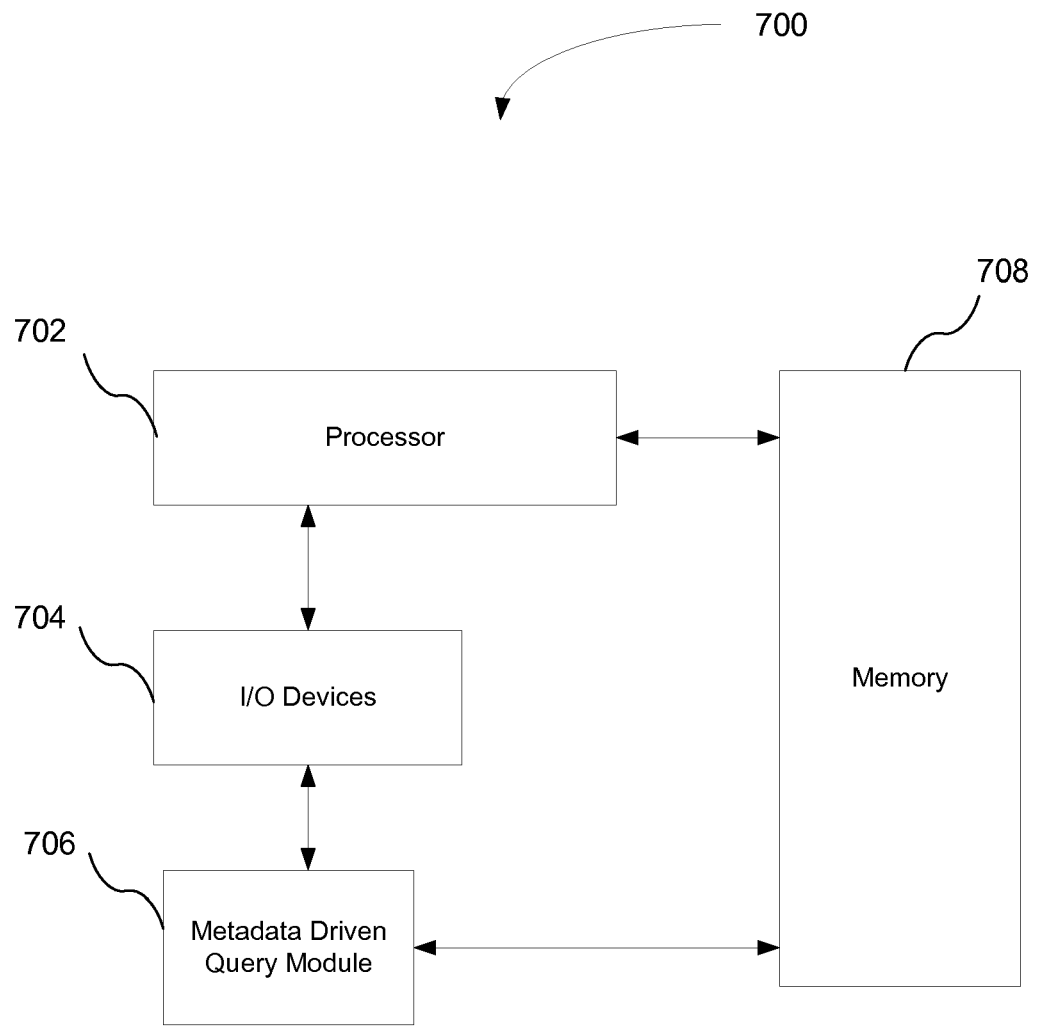
FIG. 7 illustrates a block diagram of a system that generates a metadata driven query.

FIG. 7 illustrates a block diagram of a system 700 that generates a metadata driven query. In one embodiment, the system 700 is suitable for storing and/or executing program code and is implemented using a general purpose computer or any other hardware equivalents. Thus, the system 700 comprises a processor 702, a memory 708, e.g., random access memory ("RAM") and/or read only memory ("ROM"), a metadata driven query module 706, and various input/output devices 704.

The processor 702 is coupled, either directly or indirectly, to the memory 708 through a system bus. The memory 708 can include local memory employed during actual execution of the program code, bulk storage, and/or cache memories which provide temporary storage of at least some program code in order to reduce the number of times code must be retrieved from bulk storage during execution.

The input/output devices 704 can be coupled directly to the system 700 or through intervening input/output controllers. Further, the input/output devices 704 can include a keyboard, a keypad, a mouse, a microphone for capturing speech commands, a pointing device, and other user input devices that will be recognized by one of ordinary skill in the art. Further, the input/output devices 704 can include a receiver, transmitter, speaker, display, image capture sensor, biometric sensor, etc. In addition, the input/output devices 704 can include storage devices such as a tape drive, floppy drive, hard disk drive, compact disk ("CD") drive, etc.

Network adapters may also be coupled to the system 700 to enable the system 500 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include CD—read only memory ("CD-ROM"), CD—read/write ("CD-R/W"), and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

I claim:

1. A computer program product comprising a computer useable storage medium having a computer readable program, wherein the computer readable program when executed on a computer causes the computer to:

receive a first query with a first query data format and a second query with a second query data format, the first query data format being distinct from the second query data format;

generate a common metadata based query object by converting the first query and the second query into a common metadata format that includes first metadata for the first query, second metadata for the second query, first data associated with the first query, and second data associated with the second query;

wherein the metadata includes a condition value for a condition in the query;

extract the first metadata and the second metadata from the common metadata based query object;

generate a first application specific query based on the first metadata and a first application to which the first query is intended;

generate a second application specific query based on the second metadata and a second application to which the second query is intended; and wherein the application is configured for a specific enterprise information system.

2. The computer program product of claim 1, wherein the metadata includes a target component in an enterprise information system for which the query is intended.

3. The computer program product of claim 1, wherein the metadata includes an expected return property.

4. The computer program product of claim 1, wherein the metadata includes a query type.

5. The computer program product of claim 1, wherein the metadata includes a condition type for a condition in the query.

6. A method comprising:

receive a first query with a first query data format and a second query with a second query data format, the first query data format being distinct from the second query data format;

generate a common metadata based query object by converting the first query and the second query into a common metadata format that includes first metadata for the first query, second metadata for the second query, first data associated with the first query, and second data associated with the second query;

wherein the metadata includes a condition value for a condition in the query;

extract first the metadata and the second metadata from the common metadata based query object;

generate a first application specific query based on the first metadata and a first application to which the first query is intended;

generate a second application specific query based on the second metadata and a second application to which the second query is intended; and wherein the application is configured for a specific enterprise information system.

7. The method of claim 6, wherein the metadata includes a target component in an enterprise information system for which the query is intended.

8. The method of claim 6, wherein the metadata includes an expected return property.

9. The method of claim 6, wherein the metadata includes a query type.

10. The method of claim 6, wherein the metadata includes a condition type for a condition in the query.

11. A system including a processor comprising:

a query-to-data format converter that receives a first query with a first query data format and a second query with a second query data format and generates a common metadata based query object by converting the first query and the second query into a common metadata format that includes first metadata for the first query, second metadata for the second query, first data associated with the first query, and second data associated with the second query, the first query data format being distinct from the second query data format;

wherein the metadata includes a condition value for a condition in the query;

a query executor that extracts, with the processor, the first metadata and the second metadata from the common metadata based query object, generates a first application specific query based on the first metadata and a first application to which the first query is intended, and generates a second application specific query based on the second metadata and a second application to which the second query is intended; and wherein the application is configured for a specific enterprise information system.

12. The system of claim 11, wherein the metadata includes an expected return property.

13. The system of claim 11, wherein the metadata includes a query type.

14. The system of claim 11, wherein the metadata includes a condition type for a condition in the query.

* * * * *